United States Patent
Sottiaux et al.

(10) Patent No.: US 9,327,832 B2
(45) Date of Patent: May 3, 2016

(54) ELASTOMERIC BEARING WITH TAPERED SHIMS

(75) Inventors: Daniel P. Sottiaux, Flower Mound, TX (US); Frank B. Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 826 days.

(21) Appl. No.: 13/597,433

(22) Filed: Aug. 29, 2012

(65) Prior Publication Data

US 2013/0084186 A1 Apr. 4, 2013

Related U.S. Application Data

(60) Provisional application No. 61/542,584, filed on Oct. 3, 2011.

(51) Int. Cl.
| | |
|---|---|
| *B64C 27/35* | (2006.01) |
| *B64C 11/02* | (2006.01) |
| *F16C 27/06* | (2006.01) |
| *F16F 1/40* | (2006.01) |

(52) U.S. Cl.
CPC ............ *B64C 27/35* (2013.01); *B64C 11/02* (2013.01); *F16C 27/06* (2013.01); *F16F 1/403* (2013.01); *B64C 2700/6283* (2013.01)

(58) Field of Classification Search
CPC ........ B64C 11/02; B64C 11/04; B64C 27/35; B64C 27/39; B64C 27/41; B64C 27/43; B64C 27/48; B64C 2700/6283; F01D 25/164; F16C 27/063; F16C 27/00; F16C 27/02
See application file for complete search history.

(56) References Cited

U.S. PATENT DOCUMENTS

| | | | | |
|---|---|---|---|---|
| 3,071,422 | A | * | 1/1963 | Hinks ........................ 384/221 |
| 3,862,812 | A | | 1/1975 | Gorndt et al. |
| 3,967,918 | A | * | 7/1976 | Mouille et al. ............... 416/141 |
| 3,999,887 | A | | 12/1976 | McGuire |
| 4,115,031 | A | | 9/1978 | Drees et al. |

(Continued)

FOREIGN PATENT DOCUMENTS

| | | |
|---|---|---|
| CN | 1214016 A | 6/2001 |
| CN | 101936337 A | 1/2011 |

OTHER PUBLICATIONS

Chinese Office Action in related Chinese Application No. 201210376396.0, dated Aug. 27, 2014, 10 pages.

(Continued)

*Primary Examiner* — Ninh H Nguyen
(74) *Attorney, Agent, or Firm* — Noah A. Tevis

(57) ABSTRACT

The centrifugal force bearing includes a plurality of tapered metal shims such that the thicker end of each tapered metal shim near the inner portion of bearing. The bearing can include a plurality of tapered elastomeric members that are consequently tapered so that the inner portions are narrower than the outer portions. The tapered metal shims can increase the axial stiffness in the direction of the centrifugal force, thereby reducing the axial deflection under loading, as compared to non-tapered shims. Further, reducing axial deflection reduces clearance issues that may arise when the rotor blade is allowed to axial deflect significant distances. As such, the tapered metal shims can increase the capacity of the bearing. Tapering the metal shims can decrease the compression induced shear strain near the outer portions of the elastomeric member, where loads are typically higher.

16 Claims, 2 Drawing Sheets

FIG. 4

(56) References Cited

U.S. PATENT DOCUMENTS

| | | | |
|---|---|---|---|
| 4,142,833 A * | 3/1979 | Rybicki | B64C 27/48 384/221 |
| 4,257,739 A | 3/1981 | Covington et al. | |
| 4,333,728 A | 6/1982 | Drees et al. | |
| 4,477,225 A | 10/1984 | Burkam | |
| 4,566,856 A | 1/1986 | Miller | |
| 4,569,629 A | 2/1986 | Ferris et al. | |
| 4,588,356 A * | 5/1986 | Pariani | 416/140 |
| 4,895,354 A | 1/1990 | Byrnes | |
| 5,110,259 A | 5/1992 | Robinson | |
| 5,601,408 A | 2/1997 | Hunter et al. | |
| 5,905,212 A | 5/1999 | Moses et al. | |
| 6,287,076 B1 * | 9/2001 | Mouille | 416/134 A |
| 6,296,444 B1 | 10/2001 | Schellhase et al. | |
| 6,439,849 B1 | 8/2002 | Sehgal et al. | |
| 6,523,708 B2 | 2/2003 | Weckbecker | |
| 6,726,394 B2 | 4/2004 | Garnier et al. | |
| 6,827,553 B2 | 12/2004 | Jones et al. | |
| 6,848,886 B2 | 2/2005 | Schmaling et al. | |
| 7,097,169 B2 | 8/2006 | Mueller | |
| 7,368,158 B2 | 5/2008 | Herpin et al. | |
| 7,686,584 B2 * | 3/2010 | Schmaling | B64C 27/51 384/221 |
| 7,850,429 B2 | 12/2010 | Pancotti | |
| 7,896,747 B2 | 3/2011 | Russell | |
| 8,029,371 B2 | 10/2011 | Stamps et al. | |
| 8,181,755 B2 | 5/2012 | Stamps et al. | |
| 8,257,051 B2 | 9/2012 | Stamps et al. | |
| 8,275,585 B2 | 9/2012 | Cunningham et al. | |
| 8,360,721 B2 | 1/2013 | Podgurski et al. | |
| 8,511,997 B2 | 8/2013 | Cunningham et al. | |
| 8,764,300 B2 | 7/2014 | Errard et al. | |
| 8,882,462 B2 | 11/2014 | Schmaling et al. | |
| 8,926,281 B2 | 1/2015 | Stamps et al. | |
| 8,956,117 B2 | 2/2015 | Stamps et al. | |
| 8,961,325 B2 | 2/2015 | Schofield et al. | |
| 9,010,679 B2 | 4/2015 | Sutton et al. | |
| 9,068,621 B1 | 6/2015 | Halladay et al. | |
| 9,085,357 B2 | 7/2015 | Davis et al. | |
| 2003/0235499 A1 | 12/2003 | Schmaling | |
| 2004/0136829 A1 | 7/2004 | Jones et al. | |
| 2004/0208745 A1 | 10/2004 | Schmaling | |
| 2005/0001366 A1 | 1/2005 | Hederstiema | |
| 2005/0073111 A1 | 4/2005 | Herpin et al. | |
| 2006/0067823 A1 | 3/2006 | Pancotti | |
| 2007/0137956 A1 | 6/2007 | Stamps et al. | |
| 2009/0175725 A1 | 7/2009 | Podgurski et al. | |
| 2009/0268997 A1 | 10/2009 | Cunningham et al. | |
| 2010/0009764 A1 | 1/2010 | Stamps et al. | |
| 2011/0274548 A1 | 11/2011 | Stamps et al. | |
| 2012/0257847 A1 | 10/2012 | Allred et al. | |
| 2013/0121828 A1 | 5/2013 | Davis et al. | |
| 2013/0216384 A1 | 8/2013 | Stamps et al. | |
| 2013/0341458 A1 | 12/2013 | Sutton et al. | |
| 2014/0270610 A1 | 9/2014 | Schofield et al. | |

OTHER PUBLICATIONS

European Search Report in related European Application No. 13189561.7, dated Jan. 24, 2014, 7 pages.

Canadian Office Action in related Canadian Application No. 2,790,085, dated Jan. 16, 2014, 2 pages.

European Search Report in related European Application No. 12185110.9, dated Mar. 11, 2013, 6 pages.

Office Action in related U.S. Appl. No. 14/029,906 dated Nov. 13, 2015, 10 pages.

* cited by examiner

ELASTOMERIC BEARING WITH TAPERED SHIMS

BACKGROUND

1. Technical Field

The apparatus of the present application relates to a centrifugal force bearing for a rotor hub.

2. Description of Related Art

Centrifugal force bearings can include a combination of elastomeric members and metal shims of uniform thickness. The compression induced shear strain of the elastomeric members is typically the leading life limiter of the bearing.

Hence, there is a need for an improved bearing design having reduced compression induced shear strain during operation. Further, there is a need for a bearing that provides increased load capacity without increasing the size of the bearing.

DESCRIPTION OF THE DRAWINGS

The novel features believed characteristic of the apparatus of the present application are set forth in the appended claims. However, the apparatus itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the apparatus are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The apparatus of the present application is a bearing having alternating layers of tapered shims and tapered elastomeric members that are collectively configured to reduce compression induced shear strain of the elastomeric members. It should be appreciated that even though the tapered shims are described herein as being metal, tapered shims can be manufactured with any rigid material, such as a composite material for example.

Figure 1:
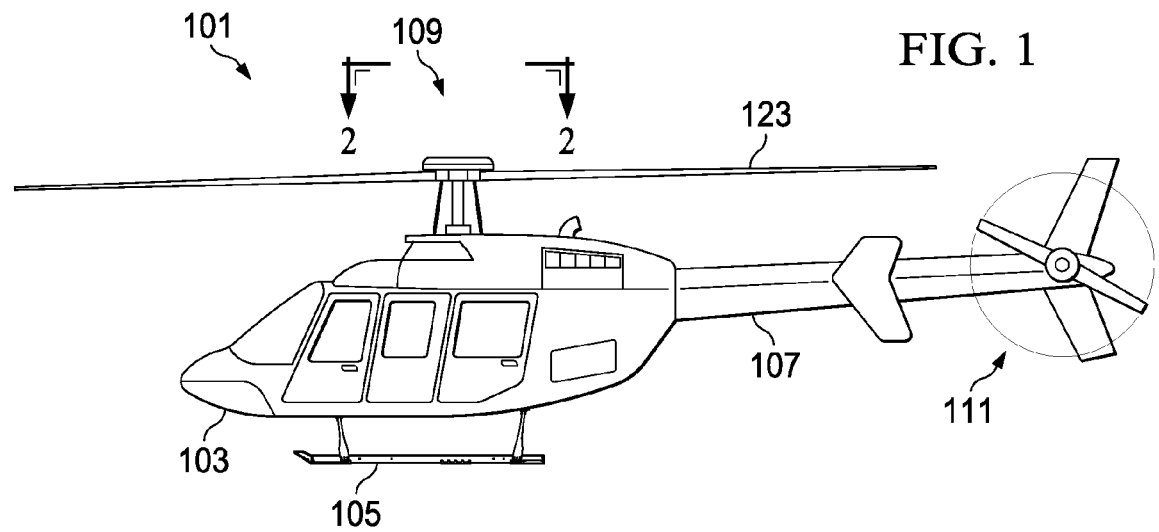
FIG. 1 is a side view of a rotorcraft having a bearing, according to an illustrative embodiment of the present application.

Referring to FIG. 1, an example rotorcraft 101 is illustrated. Rotorcraft 101 can include a fuselage 103, a landing gear 105, a tailboom 107, a main rotor system 109 having rotor blades 123, and a tail rotor system 111. It should be appreciated that rotorcraft 101 is merely illustrative of a wide variety of aircraft that can implement the apparatus discloses herein, such as bearing 301. Other aircraft implementations can include hybrid aircraft, tilt rotor aircraft, unmanned aircraft, gyrocopters, and a variety of helicopter configurations, to name a few examples.

Figure 2:
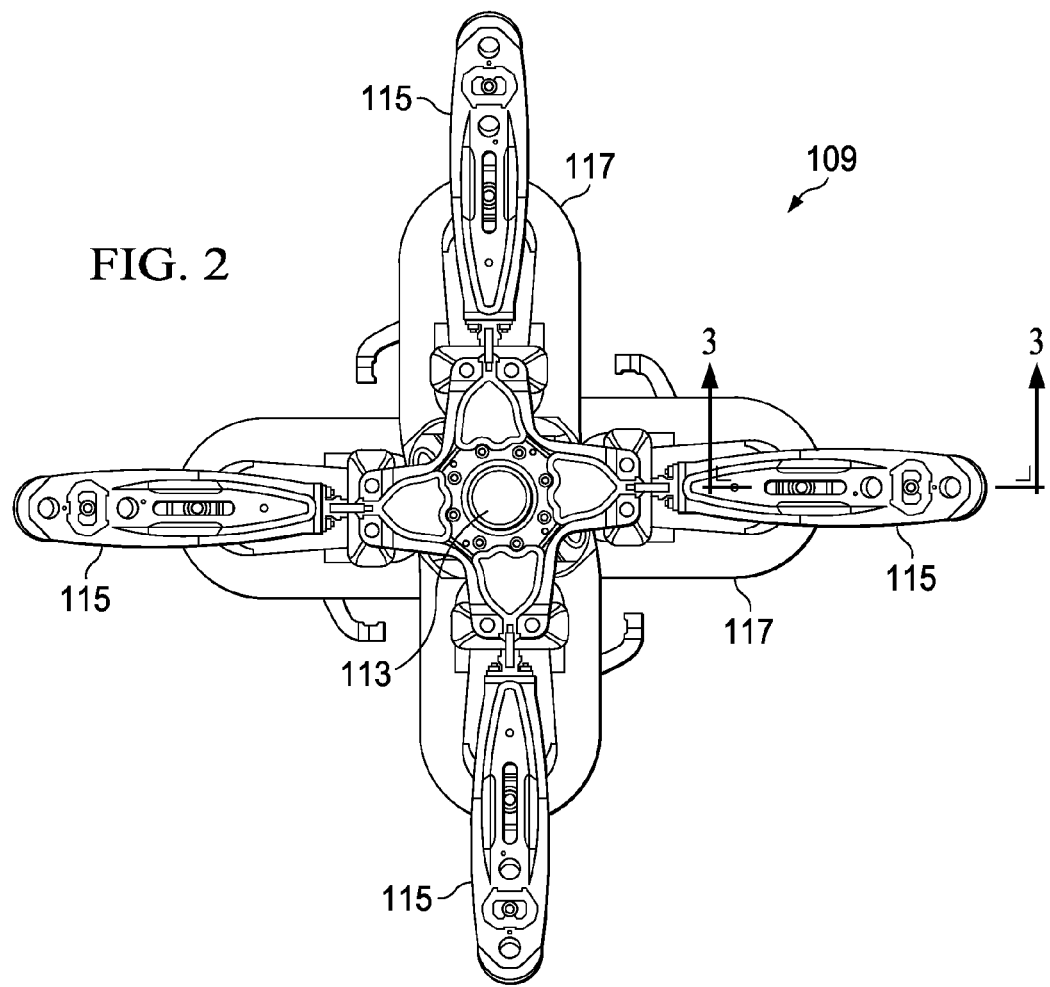
FIG. 2 is a top sectional view of the main rotor hub of the rotorcraft, taken at section lines 2-2 in FIG. 1, according to an illustrative embodiment of the present application.
Figure 3:
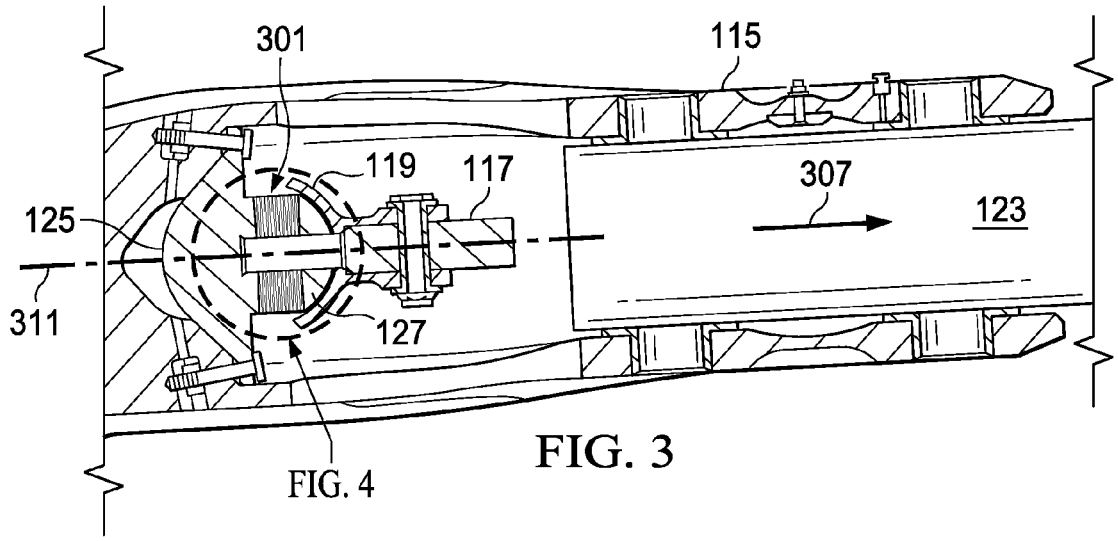
FIG. 3 is a cross-sectional view of the main rotor hub, taken from section lines 3-3 in FIG. 2, according to the illustrative embodiment of the present application.

Referring to FIGS. 2 and 3, main rotor system 109 can include rotor yokes 117 and rotor grips 115. Each rotor grip 115 is configured for receiving and coupling to one of rotor blades 123. During operation, the rotation of the rotor blades 123 around an axis of rotation, defined by a rotor mast 113, can cause a centrifugal force 307 that is reacted by compression of bearing 301. A bearing support 119 can be used to provide a bearing surface for bearing 301. Further, bearing 301 can have a base member 125 configured for coupling to rotor grip 115. Bearing 301 can be configured to react compressive, torsional, and flapping motions between rotor blade 123 and rotor yoke 117.

Figure 4:
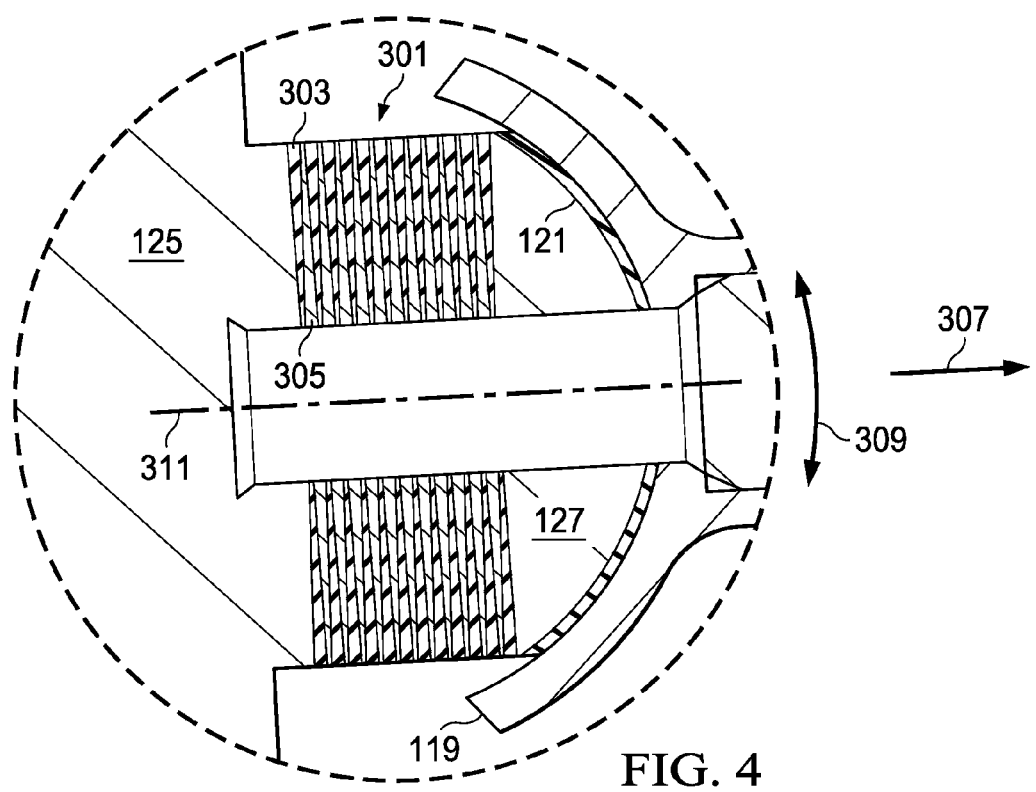
FIG. 4 is an enlarged cross-sectional view of the bearing, according to the illustrative embodiment of the present application.

Referring to FIG. 4, a cross-sectional view through bearing 301 is illustrated. Bearing 301 includes a plurality of tapered metal shims 305 such that the thicker end of each metal shim 305 is near the inner portion of bearing 301. As shown in FIG. 4, each metal shim 305 is narrower toward the outer portion of bearing 301. Bearing 301 can further include a plurality of tapered elastomeric members 303 that are consequently tapered so that the inner portions are narrower than the outer portions. Bearing 301 can have a cap member 127 located between the alternating layers of tapered shims 305 and tapered elastomeric members 303. Cap member 127 can be a rigid member that mates to the outboard elastomeric member 303 and elastomeric portion 121, the elastomeric portion 121 being configured as a joint between the mating spherical surfaces of cap member 127 and bearing support 119.

When subjected to a centrifugal force 307, the tapered metal shims 305 function to increase the axial stiffness in the direction of the centrifugal force 307. One beneficial result is that increasing axial stiffness, a reduction in the axial deflection under loading is achieved, as compared to non-tapered shims. The increase in axial stiffness in direction 307 can be attributed to the majority of the operational compression load being reacted by the interior portion (where metal shims 305 are thicker), thereby preventing the outer portions (wherein the elastomeric members 303 are thicker) from reacting the compression load, which reduces compression induced shear strain near the outer portions of the elastomeric members 303, where loads are typically higher. Since compression induced shear strain typically drives the size of the bearing during design, bearing 301 can be sized smaller than a convention bearing having non-tapered shims, while having the same capability.

Further, reducing axial deflection reduces clearance issues that may arise when the rotor blade is allowed to axial deflect significant distances. As such, tapering metal shims 305 can increase the capacity of the bearing 301, as compared to non-tapered shims.

During operation, bearing 301 may be subjected to not only a centrifugal force 307, but also a flapping (cocking) force 309. An elastomeric portion 121 can be configured to deflect upon a flapping force 309. Further, elastomeric members 303 can also deflect when subjected to flapping force 309.

Further, during operation a torsional load can be subjection on the bearing 301 when the pitch of rotor blade 123 is changed. The resulting torsional deflection can occur about a centerline axis 311, which also corresponds to the pitch change axis of the rotor blade 123. Another unique advantage to bearing 301 is that since the outer portion has more elastomeric material, as compared to the inner portion, the elastomeric members 303 can carry the strain from the torsional loading. Having a bearing that carry the torsional strain, while act stiff in axial compression can be very desirable. Further, the degree and size of the tapered metal shims 305 and tapered elastomeric members 303 can be selected to individually tailor the torsional capacity and axial stiffness of bearing 301.

The bearing of the present application provides significant advantages, including: 1) decreasing compression induced shear strain of the elastomeric portions of the bearing, 2) increasing a usage life of the bearing, 3) reducing the size of the bearing, 4) increasing the torsional capacity of the bearing, and 5) increase axial compression stiffness so as to decrease load deflection and clearance requirements.

The particular embodiments disclosed above are illustrative only, as the apparatus may be modified and practiced in different but equivalent manners apparent to those skilled in the art having the benefit of the teachings herein. Modifications, additions, or omissions may be made to the apparatuses described herein without departing from the scope of the invention. The components of the apparatus may be integrated or separated. Moreover, the operations of the apparatus may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A bearing comprising:
   a base member;
   a cap member;
   alternating separate non-continuous layers of shim members and elastomeric members between the base member and a support member, the shim members being tapered;
   wherein the bearing is a centrifugal force bearing for a rotor hub; and
   wherein the shim members are tapered such that a narrow portion is located near an outer portion of the bearing.

2. The bearing according to claim 1, wherein the elastomeric members are tapered such that a narrow portion is located near an inner portion of the bearing.

3. The bearing according to claim 1, wherein the elastomeric members are tapered such that a wide portion is located near an outer portion of the bearing.

4. The bearing according to claim 1, wherein the shim members are of a metal material.

5. The bearing according to claim 1, wherein the shim members are of a composite material.

6. The bearing according to claim 1, further comprising:
   a bearing support having an inner spherical surface that is joined to an outer spherical surface of the cap member with an elastomeric portion.

7. The bearing according to claim 1, wherein the base member is adapted for coupling to a rotor grip portion of the rotor hub.

8. The bearing according to claim 1, wherein the cap member is adapted for coupling to a rotor yoke via a bearing support.

9. A bearing comprising:
   a base member;
   a cap member;
   alternating separate non-continuous layers of shim members and elastomeric members between the base member and a support member, the shim members being tapered;
   wherein the bearing is a centrifugal force bearing for a rotor hub; and
   wherein the shim members are tapered such that a wide portion is located near an inner portion of the bearing.

10. The bearing according to claim 9, wherein the elastomeric members are tapered such that a narrow portion is located near an inner portion of the bearing.

11. The bearing according to claim 9, wherein the elastomeric members are tapered such that a wide portion is located near an outer portion of the bearing.

12. The bearing according to claim 9, wherein the shim members are of a metal material.

13. The bearing according to claim 9, wherein the shim members are of a composite material.

14. The bearing according to claim 9, further comprising:
    a bearing support having an inner spherical surface that is joined to an outer spherical surface of the cap member with an elastomeric portion.

15. The bearing according to claim 9, wherein the base member is adapted for coupling to a rotor grip portion of the rotor hub.

16. The bearing according to claim 9, wherein the cap member is adapted for coupling to a rotor yoke via a bearing support.

* * * * *